United States Patent [19]

Holmquist

[11] Patent Number: 4,811,694

[45] Date of Patent: Mar. 14, 1989

[54] BIRD FEEDER WITH SCALE

[76] Inventor: Melvin L. Holmquist, 201 Happy Hollow Rd., Grand Rapids, Minn. 55744

[21] Appl. No.: 29,739

[22] Filed: Mar. 24, 1987

[51] Int. Cl.⁴ .............................................. A01K 39/00
[52] U.S. Cl. .................................................. 119/52 R
[58] Field of Search ....................... 119/51 R, 52 R, 26, 119/63

[56] References Cited

U.S. PATENT DOCUMENTS

| | | | |
|---|---|---|---|
| 2,230,058 | 3/1939 | Hornung | 119/52 R |
| 3,041,911 | 7/1962 | Marder | 119/26 |
| 3,124,103 | 3/1964 | Stainbrook | 119/63 |
| 3,847,120 | 11/1974 | Hicks | 119/26 |
| 3,929,277 | 12/1975 | Byrne et al. | 119/51 R |
| 4,038,639 | 7/1977 | Kuebler | 340/272 |
| 4,288,856 | 9/1981 | Linseth | 364/567 |
| 4,624,215 | 11/1986 | Goldstein | 119/51 R |

FOREIGN PATENT DOCUMENTS 332737 7/1929 United Kingdom .................. 119/26

Primary Examiner—Robert P. Swiatek
Assistant Examiner—R. Thomas Price
Attorney, Agent, or Firm—Kinney & Lange

[57] ABSTRACT

A bird feeder having a movable perch that is coupled to a scale or weight indicator to provide the weight of a bird that rests on the perch adjacent the feeder for permitting the study of bird feeding habits and weight. The scale can be used with different types of weighing mechanisms, but upon lighting on the perch, a signal is provided to sound an alarm, and/or give an indication that a bird has alighted, and then to provide a weight signal that can be on a meter or a chart recorder, or the like.

6 Claims, 2 Drawing Sheets

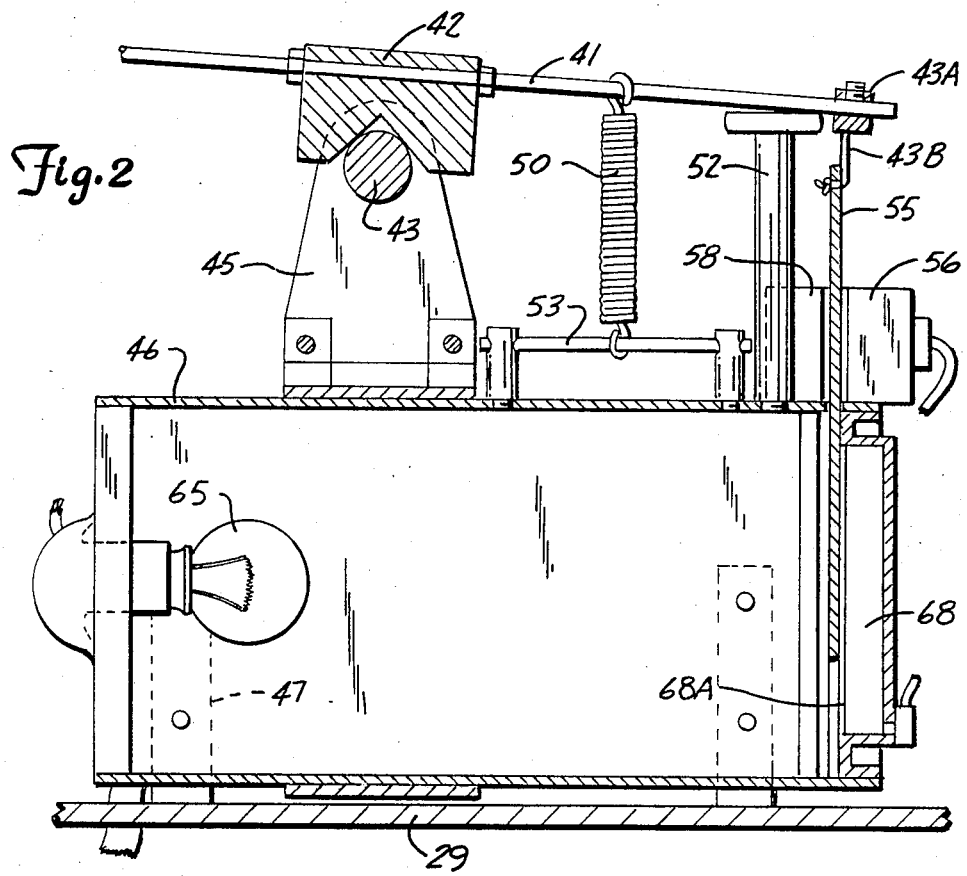
*Fig.2*
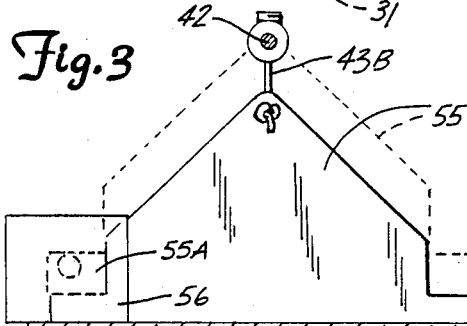
*Fig.3*    *Fig.4*

BIRD FEEDER WITH SCALE

BACKGROUND OF THE INVENTION

1. Field of the Invention.

The present invention relates to a weighing device for permitting study of birds utilizing a bird feeder scale.

2. Description of the Prior Art.

Scales for weighing livestock such as turkeys and the like have been advanced, in a total integrated system, as shown in U.S. Pat. No. 4,624,215. However, this does not permit studying of individual feeding habits, but merely provides a resting place for turkeys and is used to provide information that is signaled to a computer and is stored so that an average weight of a number of birds or animals can be calculated.

Alarm systems utilizing bird perches have also been advanced. U.S. Pat. No. 4,038,639 shows a bird perch alarm that has a direct acting contact that sounds a bell to scare off birds, and U.S. Pat. No. 3,847,120 illustrates a system having a movable perch that turns on a record to encourage a bird that lights on the perch to learn to talk and respond to the record.

A livestock feeding management method and apparatus is shown in U.S. Pat. No. 4,288,856, which individually provides for keeping track of animals that are introduced into a feed lot.

SUMMARY OF THE INVENTION

The present invention is a bird feeder having a perch that will shift when a bird alights on it, and will provide an indication of the presence of the bird, and the ability to record weights of the bird. The scale is sensitive enough so that the feed consumed by the bird on the perch can be determined.

The circuit that is used for determining the weight can be selected as desired, and provides sufficient signals so that the output weight can be recorded on a recorder, for studying bird feeding habits. The bird feeder permits people studying wild birds to make records of the type of bird, weights, and to determine average weights. If the birds are marked with a marking, a study of particular birds can be made over a season from a single location.

The bird perch is on an outdoor feeder, and even though movement of the perch is necessary in order to activate the alarm system and the weight recording system, so that a permanent record can be obtained.

Override on/off switches, of course, can be used for times when the activity is not to be monitored, and in general the device provides for a simple way of measuring bird weight by utilizing a movable, slidable perch that has a direct weighing system thereon that is coupled to suitable circuitry for alarms and for obtaining a weight that is proportional to movement of the perch.

BRIEF DESCRIPTION OF THE DRAWINGS

FIG. 2 is a sectional view showing a typical light-sensitive arrangement for utilizing a solar cell for providing a weight signal;

FIG. 3 is an end view of the device of FIG. 2; and

FIG. 4 is a modified form of the invention illustrating a strain gauge system for determining bird weight.

DETAILED DESCRIPTION OF THE PREFERRED EMBODIMENTS

Figure 1:
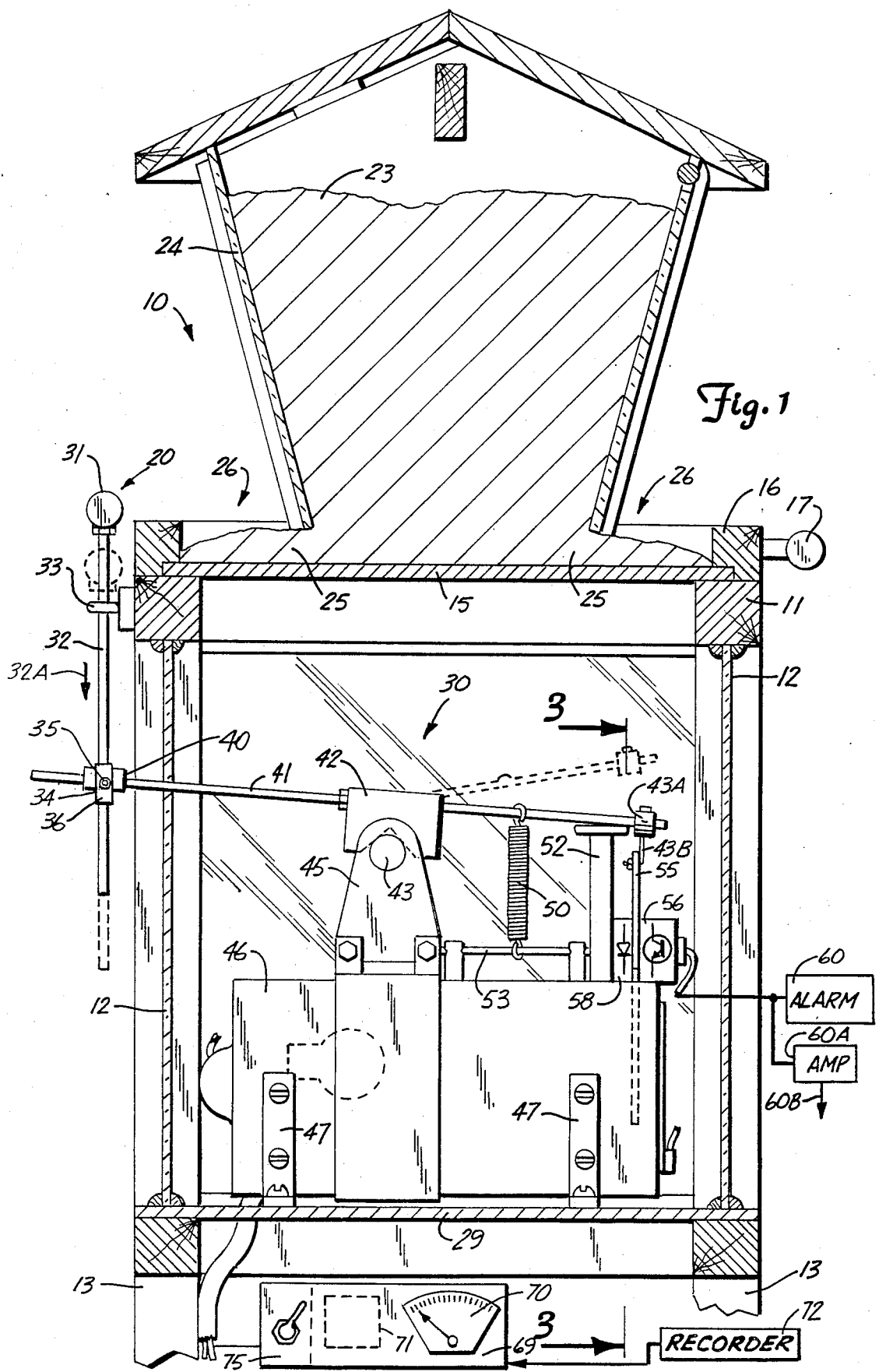
FIG. 1 is a sectional view of a typical bird feeder having a bird weighing arrangement made according to the present invention installed thereon.

Referring to FIG. 1, a bird feeder assembly indicated generally at 10 includes a support housing 11, that has a frame and clear plexiglass walls 12 around the perimeter, and in turn the frame 11 is supported on suitable support posts 13. The bird feeder, of course, could be suspended from its top, or supported in any desired manner.

The feeder assembly 10 includes a feeder base 15, that is supported on a second frame 16. The frame 16 has a fixed perch 17 on one side, and on the opposite side, a movable weighing perch assembly indicated generally at 20 is mounted. The perch assembly 20 forms a part of the bird weight indicating device of the present invention.

The bird feeder includes a feed storage housing section that is made in a conventional manner and includes suitable seed or other bird feed 23. Tapered side walls 24, which are generally clear so that the birds sitting on the perches can see the feed, have outlet openings 25 at the bottom, through which the feed can flow onto the feeder base 15 into a feeding opening 26 on each side of the bird feeder.

In the first form of the invention, a weighing system indicated generally at 30 is mounted on the support housing 11, between walls 12, and is supported on a suitable floor board 29. The weighing system includes the perch assembly 20, which has a bird support perch rod 31 extending transversely of the feeder for a selected distance, for example, three or four inches. This perch rod 31 is mounted onto a vertical slidable guide shaft 32, which is guided with a screw eye 33 or other suitable sliding bearing. The guide shaft 32 extends downwardly below the perch rod 31, and mounts through a coupling sleeve arrangement 34. A set screw 35 on a sleeve 36 is used to adjust the vertical position of the shaft 32 relative to the sleeve 36. Additionally, a second sleeve indicated at 40 is at right angles to the sleeve 36 and is slidably mounted on a pivot lever 41. The position of the coupling sleeve arrangement 34 can be adjusted as desired. The arrangement can be made as a double assembly so that there will be pivoting movement permitted between the sleeves 36 and 40 and thus between guide shaft 32 and the pivot lever 41. The pivot lever 41 passes through a slot provided in the panel 12 at that side of the housing 11.

The pivot lever 41 is mounted in a support block 42, and has an opposite end indicated generally at 41A on which another connector sleeve 43A is mounted. The support block 42 is coupled to a pivot shaft 43, and can be used to form a pivoting assembly. The pivot shaft 43 can be mounted in suitable bearings (not shown) and the support block 42 can be fixed to the shaft, or any suitable pivot arrangement can be made. The pivot shaft 43 in turn is mounted on spaced apart supports 45 that are supported on a control housing 46. The control housing 46 in turn is supported with suitable supports 47 to the floor 29.

A very light tension spring indicated at 50 is coupled to the pivot lever 41, on an opposite side of the pivot shaft 43 from the connection to the perch rod 31, and urges the pivot lever 41 to a rest position against a suitable stop indicated at 52, which is mounted on housing 46.

The connector sleeve 43A has a strap or hook 53 mounted thereon, which can swivel and which has a hook attached to a slidable vertically movable shutter 55, that comprises the alarm sensor activator and also the weight determining device in this form of the invention. The spring 50 as shown is supported on a support 53 attached to the housing 46.

While any suitable type of control and weight indicating arrangement can be used, it is desirable to first have some type of an alarm or signal when a bird alights on the perch rod 31. In this form of the invention, a suitably powered infrared light emitting diode and light-sensitive transistor is used. A light emitting diode in a package 58 is mounted on housing 36 and a light-sensitive transistor 56 is aligned with the diode. The shutter 55 as shown in FIG. 3 is on a plane between the package 58 and transistor 56 and has a notch 55A in it, so that a light from light-emitting diode in package 58 will be received by the sensor 59 when there is no bird on the perch, and the shutter is in its rest position as shown in solid lines in FIGS. 1 and 3.

As soon as a bird alights on the rod 31, the guide shaft 32 will move downwardly (the spring 50, again, is very light or low force) as indicated by the arrow 32A, which will pivot the lever 41 on the axis of pivot shaft 43 to lift the end connector sleeve 43A and also lift the shutter 55 to a position to where the shutter will block off the transmission of light between the light emitting diode in package transistor 58 and the 56, causing a signal in a suitable alarm circuit indicated generally at 60 schematically to sound an audible alarm indicating that a bird has alighted on the perch.

At the same time, a light source (bulb) indicated at 65 can be either automatically turned on by the same signal that energizes the alarm 60 or the light can be manually turned on. The housing 46 will shield the light source and if desired, the light could be left on (as long as power was provided). Light from the source 65 will strike a solar cell indicated generally at 68, of conventional design which will provide an output voltage in proportion to the light striking its sensing surface 68A. The more surface uncovered because of greater lifting of the shutter 55, the greater the voltage output from the solar cell. The voltage is amplified through a suitable amplifier circuit 71 that can be contained in the housing 46 or in a separate control box shown at 69 in FIG. 1, and in turn energize a meter 70 that will indicate the amount of movement of the shutter, and thus the amount of weight on the perch 31. Additionally, the amplifier circuit 71 can be used for driving a strip recorder indicated schematically at 72.

The cell 68 is selected so that the amount of uncovering of the surface of the cell indicated at 68A will provide a proportional output voltage from the cell, and thus the amount that the aluminum shutter 55 raises will determine the amount of voltage being delivered by the solar cell 68. This voltage is then proportional to the weight of the bird because the uncovering of the solar cell acting to stretch spring 50 (which is very light) will provide a direct reading of the weight of the bird.

The weights being recorded are only in the range of a few ounces, so the unit can be set to be quite sensitive using existing components and power supplies. Of course, the circuit can have an on/off switch indicated at 75 for shutting off the light 65 for manually controlling it. The alarm circuit 60 can be an audible alarm, or an indicator light at a remote location, such as in the house adjacent the bird feeder, or any other type of alarm desired.

As stated, the alarm signal from the transistor 56 that indicates that the shutter has moved, can be coupled to a suitable amplifier circuit shown at 60A that will provide an output signal for turning on the light source 65, or a strip recorder, along a line 60B.

The unit is easily made, and does not disrupt the known environment of the bird because it is right at a perch that is normally on the bird feeder.

The perch rod 31 is illustrated in dotted lines in FIG. 3 to show that it extends laterally of the lever 41, a sufficient amount so a bird can sit on it, but it is restricted in length so that only a single bird will sit on it at a time under normal circumstances.

In a modified form of the invention, shown in FIG. 4, the same bird feeder housing section would be utilized, along with the support housing 11 and frame 16, but in this form of the invention a perch 80 is mounted onto a shaft 81, which is guided in at least two suitable guide bushings 82 and 83, that are attached to the bird feeder frame in a suitable manner. In this form of the invention, a very light compression spring 85 is placed around the shaft 81 and has strain gauges 85A thereon in suitable locations. One end of spring 85 bears on the perch 80 and the other end of spring 85 is supported on brushing 82. An adjustable stop nut 84 on shaft 81 bears against guide bushing 83 and limits upward movement of the perch. Because strain gauges at the present time can be very sensitive to the stress created in a spring, strain gauges can provide an adequate signal to indicate the presence and weight of a bird. Leads 86 are provided from the strain gauges to a suitable bridge and power supply circuit 87 that can be housed in a control housing or a circuit housing. A full 4-arm bridge of strain gauges can be placed on spring 85. The bridge circuit can be powered in a suitable manner. The circuit 87 provides an output signal through an amplifier in a conventional manner for strain gauge bridges. The output circuit can then drive an output indicator 91 that can be a strip chart recorder, a digital or analog meter, or an indicator light. An alarm circuit 92 can also be triggered by the output of the strain gauges and used as previously explained. The alarm can be an adjustable audible alarm that provides for different levels of alarm.

The strain gauge version of the bird feeder can be made more compact, and also can be calibrated to weigh in ounces or grams. The spring 87 can be selected so that for any particular species of birds, or a wide range of species of birds, the amount of movement of the perch will not be excessive. In the present forms of the invention, the movable perches will move down to substantially the level of the fixed perch 17 in FIG. 1 when a bird of the species desired alights on one of the movable perches.

Of course, when using the photosensitive or photovoltaic side arrangement, with the sliding shutter 55 (which is aluminum or other light material), the pivot lever 41 can be adjusted with suitable nuts at opposite ends of the pivot block 42, so that the lever pivot point can be changed. In addition, the connector sleeve 43A can be slid along the lever so that the aluminum shutter 55 is exactly vertical and slides very easily.

The position of the perch rod 31 itself also can be adjusted through the sleeve 36 FIG. 1), and the sliding second sleeve 40 on the lever 41 can be merely left loose to slide to seek its own position so there is no binding of the perch or linkage that would cause a false weight to be indicated.

The study for birds can determine the changes in weight from season to season, and the average weight of the birds from season to season. A chart record can be obtained and notes made as to the type of bird on the perch at any particular time. The power supply, of course, can either be a battery, or some type of D.C. power supply that runs off 110 volt A.C. current. The components for the circuits are standard, but do use components that do not add weight or friction to the loading. The birds can be observed while they are eating, and while the weight indicator is being observed as well. Because weights in the range of 16 grams are being taken, the reduction of drag or friction load is an important feature. Calibration can be carried out prior to the time the birds are resting on the perch.

If manual controls of the light source are used, the alarm will indicate the presence of a bird and then the light source can be turned on because it does require a substantial amount of current to drive the light source.

Although the present invention has been described with reference to preferred embodiments, workers skilled in the art will recognize that changes may be made in form and detail without departing from the spirit and scope of the invention.

What is claimed is:

1. In a bird feeder assembly having a frame, and a supply of bird feed thereon, with a station at which a bird may eat, the improvement comprising:
   a perch member;
   means coupled to said perch member for mounting the perch member to the feeder and to urge the perch member to a reference position, the means coupled being selected to permit the weight of a bird on the perch member to cause the perch member to move at a known relationship to the weight of the bird on the perch member;
   scale means coupled to the perch member providing an output signal substantially proportional to the movement of the perch member for indicating the weight of a bird on the perch member, said scale means including a pivoting lever coupled to the perch member, and having a lever end that moves in a direct proportion to the amount of movement of the perch member when a bird alights thereon; and
   means coupled to said lever for providing an output voltage substantially proportional to the movement of the lever.

2. The apparatus as specified in claim 1 wherein said means coupled to said lever comprises a shutter movably mounted between a light source and a solar cell and positioned to uncover the solar cell as a function of the movement of the perch member, said solar cell providing output voltages proportional to the light received thereby.

3. The apparatus as specified in claim 1 and alarm means responsive to the movement of said perch member when a bird alights thereon to provide a signal for indicating that a bird has moved the perch member.

4. The apparatus as specified in claim 3 and a control box for housing at least portions of said scale means mounted on said bird feeder frame.

5. A bird feeder and bird weighing device combination comprising a bird feeder having a frame, feed support means on the frame for supporting feed for birds, perch means mounted on said frame adjacent the feed support means, said perch means being mounted for movement relative to the frame along a substantially upright path, means for biasing said perch means upwardly along said path, said means for biasing comprising spring means that deflects substantially linearly with respect to the weight of a bird on the perch means to permit the perch means to move against the force of the spring responsive to the amount of deflection of said spring and means responsive to the amount of deflection of said spring and the movement of said perch means for determining the weight of a bird on the perch means, said scale means including a lever coupled to the perch means and pivotally mounted on the bird feeder, said spring being coupled to the lever, said lever being coupled to means for changing the voltage of a solar cell to indicate movement of the perch means.

6. The bird feeder of claim 5 and a stop member for stopping movement of said perch means upwardly under the urging of said spring at a desired position.

* * * * *